US 008108584 B2

(12) United States Patent
Harriman

(10) Patent No.: US 8,108,584 B2
(45) Date of Patent: Jan. 31, 2012

(54) USE OF COMPLETER KNOWLEDGE OF MEMORY REGION ORDERING REQUIREMENTS TO MODIFY TRANSACTION ATTRIBUTES

(75) Inventor: David Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 46 days.

(21) Appl. No.: 12/252,303

(22) Filed: Oct. 15, 2008

(65) Prior Publication Data

US 2010/0095032 A1  Apr. 15, 2010

(51) Int. Cl.
*G06F 13/18* (2006.01)
(52) U.S. Cl. ........................................ 710/313; 711/167
(58) Field of Classification Search .................... 710/54, 710/310, 313; 711/167–169
See application file for complete search history.

(56) References Cited

U.S. PATENT DOCUMENTS

| | | | | |
|---|---|---|---|---|
| 5,379,379 A * | 1/1995 | Becker et al. | | 711/3 |
| 5,418,940 A * | 5/1995 | Mohan | | 714/5 |
| 5,530,933 A * | 6/1996 | Frink et al. | | 711/141 |
| 5,657,472 A * | 8/1997 | Van Loo et al. | | 711/158 |
| 5,790,870 A * | 8/1998 | Hausauer et al. | | 710/260 |
| 5,860,126 A * | 1/1999 | Mittal | | 711/167 |
| 5,878,237 A * | 3/1999 | Olarig | | 710/309 |
| 6,038,646 A * | 3/2000 | Sproull | | 711/158 |
| 6,145,052 A * | 11/2000 | Howe et al. | | 711/112 |
| 6,175,889 B1 * | 1/2001 | Olarig | | 710/309 |
| 6,272,600 B1 * | 8/2001 | Talbot et al. | | 711/140 |
| 6,490,635 B1 * | 12/2002 | Holmes | | 710/3 |
| 6,615,295 B2 * | 9/2003 | Shah | | 710/54 |
| 6,625,683 B1 * | 9/2003 | Khan et al. | | 710/313 |
| 6,754,737 B2 * | 6/2004 | Heynemann et al. | | 710/39 |
| 6,757,768 B1 * | 6/2004 | Potter et al. | | 710/112 |
| 6,801,970 B2 * | 10/2004 | Riley et al. | | 710/105 |
| 6,912,612 B2 * | 6/2005 | Kapur et al. | | 710/309 |
| 6,976,135 B1 * | 12/2005 | Talbot et al. | | 711/151 |
| 7,047,374 B2 * | 5/2006 | Sah et al. | | 711/158 |
| 7,099,986 B2 | 8/2006 | Pettey et al. | | |
| 7,464,207 B2 | 12/2008 | Riley et al. | | |
| 2002/0083247 A1 | 6/2002 | Shah | | |
| 2003/0145136 A1 * | 7/2003 | Tierney et al. | | 710/3 |
| 2005/0289306 A1 * | 12/2005 | Muthrasanallur et al. | | 711/158 |
| 2007/0130372 A1 * | 6/2007 | Irish et al. | | 710/5 |
| 2007/0156946 A1 * | 7/2007 | Lakshmanamurthy et al. | | 711/5 |

FOREIGN PATENT DOCUMENTS

DE  602 16 299 T2  3/2007
JP  02293945 A * 12/1990

OTHER PUBLICATIONS

German Office Action with English language translation corresponding to International Application DE 10 2009 049 078.7-53, dated Jul. 2010.
Office Action in related Application GB0918065.4 mailed Feb. 3, 2011.
Office Action in related Application GB0918065.4 mailed Jan. 25, 2010.

* cited by examiner

*Primary Examiner* — Paul R Myers
(74) *Attorney, Agent, or Firm* — Pillsbury Winthrop Shaw Pittman LLP

(57) ABSTRACT

A method and system of relaxing the ordering of a read completion by setting an ordering attribute in the read completion. The relaxed ordering allows the read completion to bypass pending writes.

31 Claims, 4 Drawing Sheets

USE OF COMPLETER KNOWLEDGE OF MEMORY REGION ORDERING REQUIREMENTS TO MODIFY TRANSACTION ATTRIBUTES

RELATED APPLICATION

None.

FIELD

Embodiments of the invention are generally related transaction ordering and in particular to systems and methods allowing modification of strict ordering.

BACKGROUND

Peripheral Component Interconnect (PCI) is a second generation parallel bus architecture developed in 1992 as a replacement for the Industry Standard Architecture (ISA) bus. In PCI, all the devices share the same bidirectional, 32-bit (or 64-bit), parallel signal path. The PCI bus brought a number of advantages over the ISA bus, including processor independence, buffered isolation, bus mastering, and true plug-and-play operation. PCI Express (PCIe) is a third generation general-purpose serial I/O interconnect designed to replace the PCI bus. Rather than being a bus, PCIe is structured around point-to-point serial links called lanes.

The point-to-point serial link architecture of PCI Express is well suited for distributed processing via a distributed multiprocessor architecture model. Distributed processors are generally optimized to implement data packet processing functions. Unlike general-purpose CPUs that rely heavily on caching for improving performance, distributed processors have a lack of locality in packet processing and need for high-performance I/O that has pushed designers to come up with innovative architectures to reduce processing latency while still processing packets at high data rates.

Currently, transaction ordering attributes in PCIe and similar interconnects must be set by the requester. Since the host CPUs are a general resource, they do not typically have the ability to set ordering attributes according to the specific requirements of the activity being performed, and must fall back to the lowest common denominator, which leads to low performance. CPU to IO reads are often the most performance critical system transactions because a CPU core may stall waiting for the result. Improving the performance of such reads therefore leads directly to an improvement of the overall system performance by freeing CPU resources for other, more useful, work.

BRIEF DESCRIPTION OF THE DRAWINGS

The invention may best be understood by referring to the following description and accompanying drawings that are used to illustrate embodiments of the invention.

DETAILED DESCRIPTION

Figure 1:
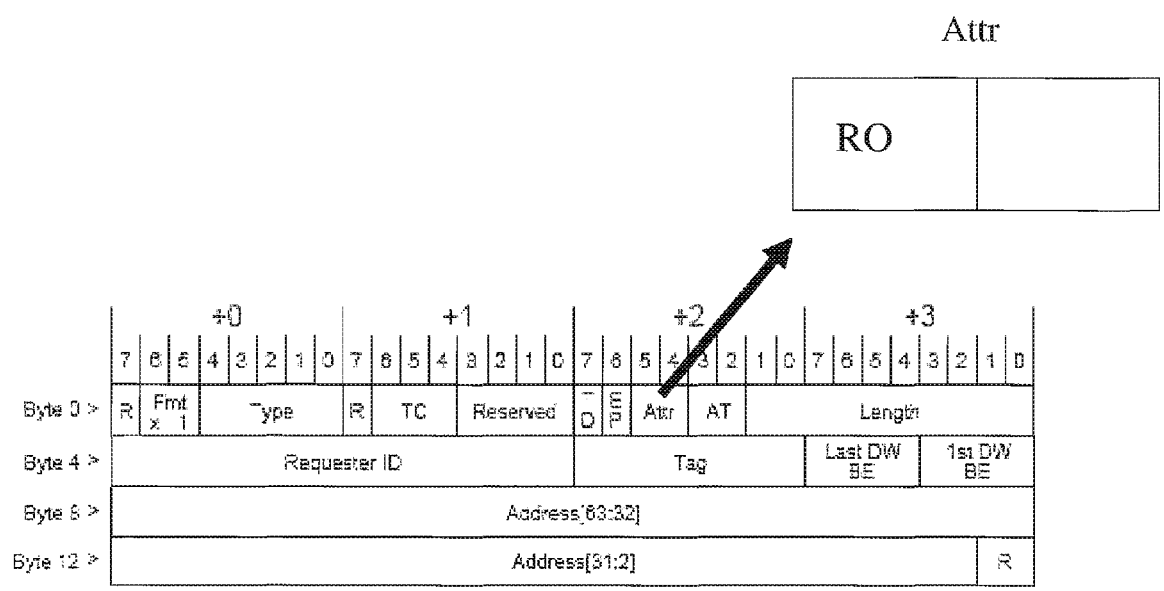
FIG. 1 is a schematic illustration of a PCIe Request Header illustrating the Relaxed Ordering Attribute.

As used in the specification and claims, the singular forms "a", "an" and "the" include plural references unless the context clearly dictates otherwise. A "root complex" ("RC") is a PCI Express device that connects a central processing unit ("CPU" or "processor") and memory to the PCI Express switch fabric. The root complex generates transaction requests on behalf of the processor. A "requester" is any device that makes a request. A "completer" is any entity that services a request. An "intermediate" is any device, such as a switch, between the requester and the completer. Typically, intermediates merely pass along the request. "Upstream" as used in the specification and claims indicates flow towards the root complex. "Downstream indicates flow away from the root complex. A "region" is a part of memory defined by an address or range of addresses. A device might, for example, might desire different behaviors for one region used to store instructions to the device and another region used for data produced or consumed by the device.

Embodiments of this invention describe how some of the performance lost to unnecessarily strict ordering can be recovered for CPU to IO device reads by having the IO device modify the ordering attributes of the completion based on the device's understanding of the transaction-specific requirements. As an example of the problem of strict ordering, consider that if a read that initially takes 2 µs to complete can be improved to 1 µs, the 1 µs difference can be "returned" to the core to do useful work—enough time to execute many thousands of instructions. Current systems frequently incur latencies on CPU to IO device reads of 0.6 µs to several µs. Large systems may incur latencies for conventionally ordered CPU to IO device reads of 4 µs. Much of this delay is caused by the conventional ordering requirement that forbids completions from bypassing writes. Since there is often a great deal of IO device to main memory write traffic, read completions to the CPU are often delayed simply by the queuing delays caused by these many writes.

PCIe and similar interconnects associate ordering attributes with transactions to allow optimized handling. For example, in PCI/PCIe the default ordering rules require read completions to wait for all previously issued writes flowing in the same direction, as a correctness requirement of the PCI Producer/Consumer Ordering model. However, this model is overly conservative for most cases. For example, it is usually necessary before reading a data structure describing an IO device's status to flush the IO device writes to main memory. Flushing the device writes is often done by having the CPU read from the device. However, once the flushing read is completed, additional device status reads typically do not need to be ordered against upstream writes. Further, it is not usually necessary to order the CPU's read against upstream writes from unrelated devices, even though the PCI/PCIe default ordering rules require this behavior.

Typically, there is no way for the host CPU to know how to mark read requests to indicate the ordering attributes required. However, the IO device typically knows which regions require conventional ordering and which do not. The ordering requirements can vary significantly from one device to another, from one register within a device to another register in the same device, and even for one register based on how the register is accessed. The knowledge of the ordering requirements could, theoretically, be communicated through device driver software running on the host, but most current Architecture CPUs provide no mechanisms for doing this. Typically, however, the IO device itself has the knowledge of the ordering requirements. The IO device, however, cannot tag the CPU to device request—this part of the transaction must be handled assuming the most conservative ordering requirements apply, unless some other mechanism is used to indicate otherwise.

In many cases the ordering requirements placed on the completion causes significant stalls. With systems and methods of the invention, however, the order requirement can be tagged by the TO device for ordering requirement relaxation where appropriate. The ordering requirement depends on the implementing architecture. In one embodiment of the invention, the architecture is PCIe. PCIe devices already have access to an ordering attribute called Relaxed Ordering (RO).

Figure 2:
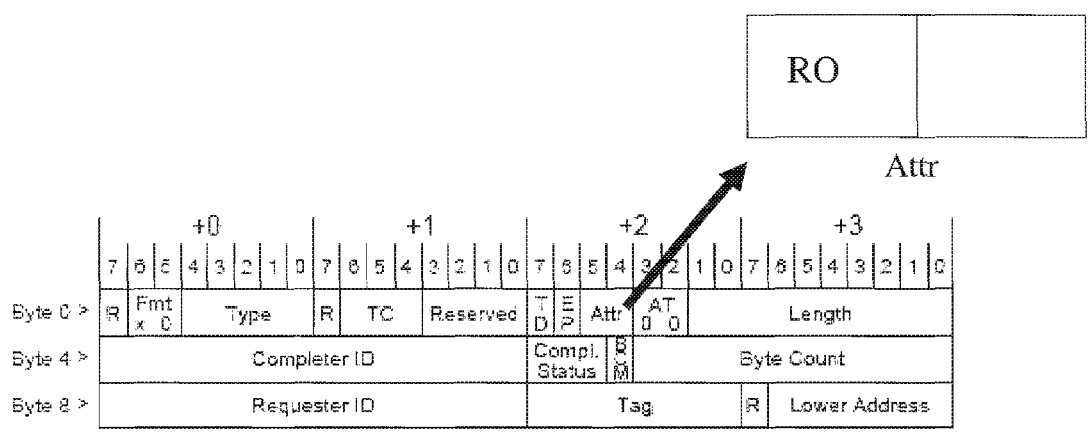
FIG. 2 is a schematic illustration of a PCIe Completion Header illustrating the Relaxed Ordering Attribute.

FIG. 1 shows the location of the RO bit in the PCIe Request Header. Typically, the RO bit is set to 0 in the request unless there is some mechanism that provides information for the CPU to comprehend which requests could allow the RO bit to be set. Per existing PCIe rules, the RO bit (and associated ordering implications) are simply copied by the completer from the Request into the Completion. FIG. 2 shows the corresponding Relaxed Ordering (RO) bit in the PCIe Completion Header.

In PCI-x/PCIe today, the RO bit is only set in the Completion Header if it was set in the corresponding Request. This policy makes sense for device reads to main memory, because it is assumed that the device "knows" which requests can be marked RO and which cannot. Embodiments of the invention recognize that CPU reads from a device can be marked RO for the Completion returned by the device. This allows the completion to bypass unrelated device writes to memory.

Figure 3:
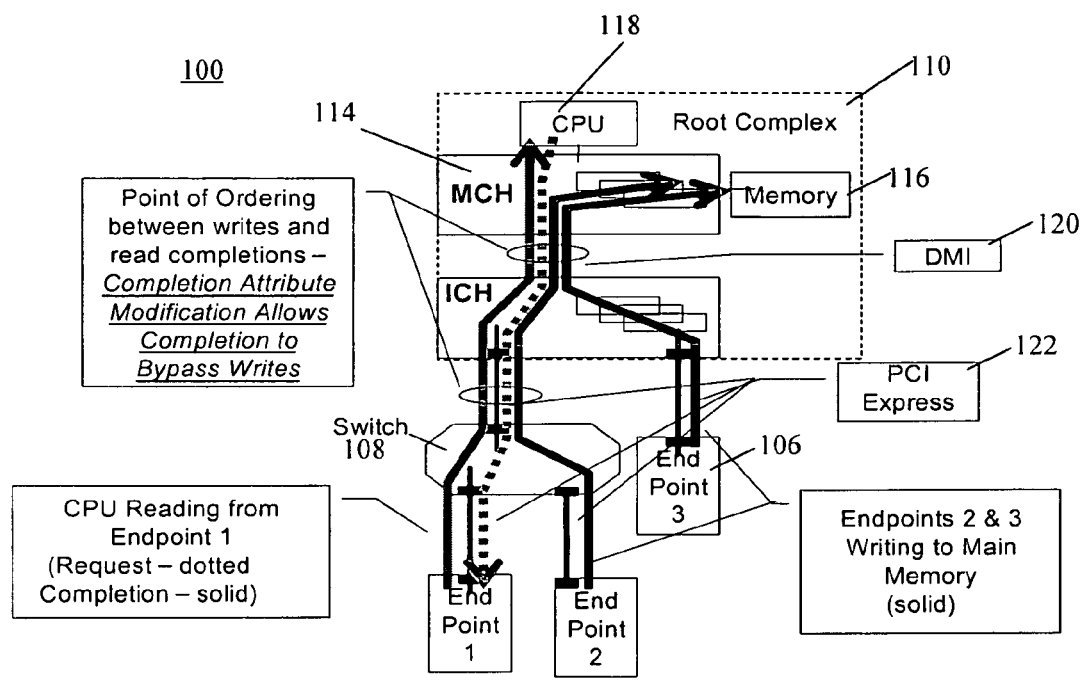
FIG. 3 is a schematic illustration of one embodiment of the invention.

FIG. 3 shows an example of how a relaxed ordering attribute (in this case, the RO bit of a PCI/PCIe completion) can be set by an TO device. In this example, the system 100 includes three PCI/PCIe Endpoints 1, 2, 3. The system 100, however, may have any number of PCI/PCIe endpoints. The first two PCI/PCIe endpoints 1, 2 connect to a switch 108 via PCIe interconnects 122. The switch 108 connects to the root complex 110 through another PCIe interconnect 122. The third PCI/PCIe endpoint 3 connects directly to the root complex 110 via a PCIe interconnect 122. The root complex 110 includes an input/output controller hub controller (ICH) 112, a memory controller hub (MCH) 114, main memory 116, and a CPU 118. The input/output controller hub controller (ICH) 112 connects to the memory controller hub (MCH) 114 via a desktop management interface (DMI) 120.

In this embodiment, Endpoints 2 and 3 are writing data to main memory 116. These writes are unrelated to the activities of Endpoint 1. A CPU core 118 is reading from Endpoint 1. Conventional PCI ordering rules forbid the completion from bypassing the writes to memory under the (overly conservative) assumption that those writes could be related to the read data. This behavior is required by the PCI producer/consumer model. Typically, Endpoint 1 "knows" if the data being read by the CPU is related to the outstanding writes to memory, and will not indicate RO for the read completion if there is a relationship to the outstanding writes. In most cases, however, Endpoint 1 "knows" that the read is not related to any outstanding writes, and in this case Endpoint 1 can safely mark the completion for RO.

Figure 4:
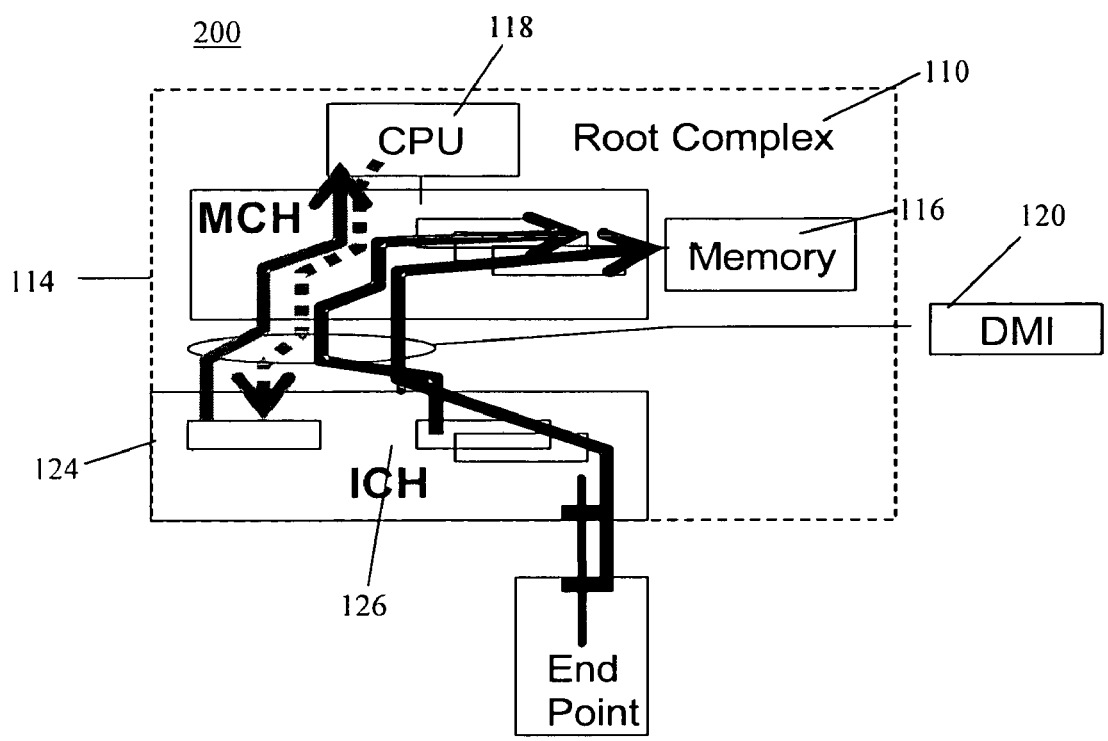
FIG. 4 is a schematic illustration of another embodiment of the invention.

FIG. 4 illustrates another embodiment of the invention in which the addressing devices are integrated in a Root Complex 110. The system 200 includes two integrated endpoints 124, 126 connected to an input/output controller hub controller (ICH) 112. The input/output controller hub controller (ICH) 11 connects to a memory controller hub (MCH) 114 via a desktop management interface (DMI) 120. The memory controller hub (MCH) 114 connects to a CPU 118 and main memory 116. This embodiment includes a single PCI/PCIe endpoint 1. The system 100, however, may have any number of integrated addressing devices 124, 126 or PCI/PCIe endpoints 1.

In many cases, the integrated addressing devices 124, 126 are used in very well defined ways, and it is possible to simplify the mechanisms used for determining when completion ordering relaxation is acceptable. Note that the specific handling of completion ordering need not follow the PCIe RO requirements. That is, other embodiments of the invention can be made simpler or more sophisticated, according to the cost/benefit desired.

FIG. 4 shows a system with Root Complex integrated devices participating in a completion ordering relaxation scheme. In the system illustrated in FIG. 4 of the following policies, or other similar policies can be implemented:
- Recognizing that CPU reads from an integrated device may never have ordering requirements against writes to main memory from other integrated devices
- Recognizing that CPU reads from an integrated device may never have ordering requirements against writes to main memory from non-integrated devices
- Recognizing that CPU reads from a non-integrated device may never have ordering requirements against writes to main memory from other integrated devices
- Recognizing that CPU reads from a non-integrated device may never have ordering requirements against writes to main memory from other non-integrated devices The examples above were illustrated with the PCI/PCIe RO attribute. However, the invention is not limited to PCI/PCIe RO. In the more general case, the ordering attribute may be different from RO. Further, the way the ordering attribute is expressed may vary. It is sufficient that the Completer has the knowledge to determine if completion ordering can safely be modified from the default behavior. Additionally, the examples above were illustrated in terms of ordering against upstream writes. The system, however, is symmetric. That is, the ordering attribute can be relaxed to change to ordering against downstream writes as well.

The embodiments of the invention may provide performance improvement that is desirable for a broad array of computer systems. PC compatible architecture systems are particularly constrained because requirements associated with support for legacy hardware and software make it very difficult to implement ordering relaxations. The mechanism described above, however, works well in PC environments.

While the invention has been described in terms of several embodiments of the invention, those of ordinary skill in the art will recognize that the invention is not limited to the embodiments of the invention described, but can be practiced with modification and alteration within the spirit and scope of the appended claims. The description is thus to be regarded as illustrative instead of limiting.

What is claimed is:
1. A data processing system comprising:
a transaction ordering mechanism of a completer configured to determine if an ordering attribute of a read completion can be relaxed by the completer independent of whether or not the ordering attribute was relaxed by a requester of a read operation associated with the read completion and further configured to relax the ordering attribute if appropriate, wherein a relaxed ordering attribute allows the read completion to bypass pending writes from one or more devices,
wherein the transaction ordering mechanism is configured to relax the ordering attribute based on a determination whether at least one of the one or more devices is integrated with a switch fabric-connecting device or not.

2. The system of claim 1, wherein the transaction ordering mechanism is configured to set a Relaxed Ordering bit in a completion header and bypass occurs in a peripheral component interconnect.

3. The system of claim 1, wherein the transaction ordering mechanism is configured to set a Relaxed Ordering bit in a completion header and bypass occurs in a desktop management interface.

4. The system of claim 1, wherein the system comprises a first endpoint device, the first endpoint device comprising the transaction ordering mechanism.

5. The system of claim 4, wherein the transaction ordering mechanism is further configured to relax the ordering attribute based on the first endpoint device's understanding of a transaction-specific requirement.

6. The system of claim 4, wherein the one or more devices include additional endpoint devices and a setting of a relaxed bit allows the read completion to bypass pending writes from the additional endpoint devices.

7. The system of claim 1, further comprising an endpoint device integrated in the switch fabric-connecting device that includes a root complex.

8. The system of claim 7, further comprising additional endpoint devices.

9. The system of claim 8, wherein at least one of the additional endpoint devices is located in the root complex.

10. The system of claim 1, wherein the transaction ordering mechanism is configured to set a Relaxed Ordering bit in a completion header by a Central Processing Unit (CPU) in the transaction ordering mechanism for a CPU read to an endpoint device.

11. The system of claim 1, wherein the read operation is associated with a first device, and wherein the transaction ordering mechanism is further configured to relax the ordering attribute based on a determination whether the first device is integrated with the switch fabric-connecting device or not.

12. A method comprising:
determining, by a transaction ordering mechanism of a completer, if an ordering attribute of a read completion can be relaxed by the completer independent of whether or not the ordering attribute was relaxed by a requester of a read operation associated with the read completion to allow the read completion to bypass one or more pending writes from one or more devices, wherein said determining operation includes determining whether at least one of the one or more devices is integrated with a switch fabric-connecting device or not; and
setting, based on the determination by the transaction ordering mechanism, the ordering attribute of the read completion with the transaction ordering mechanism of the completer to allow the read completion to bypass the one or more pending writes.

13. The method of claim 12, further comprising determining if the read completion for a first endpoint device is related to the one or more pending writes.

14. The method of claim 12, wherein setting the ordering attribute comprises setting a Relaxed Order bit in a completion header and wherein bypass occurs in a peripheral component interconnect.

15. The method of claim 12, wherein setting the ordering attribute comprises setting a Relaxed Order bit in a completion header and wherein bypass occurs in a desktop management interface.

16. The method of claim 12, wherein determining if an ordering attribute of a read completion can be relaxed is further based on the first endpoint device's understanding of a transaction specific requirement.

17. The method of claim 14, further comprising the read completion bypassing the one or more pending writes.

18. The method of claim 15, further comprising the read completion bypassing the one or more pending writes.

19. The method of claim 13, wherein the one or more pending writes are from one or more additional endpoint devices.

20. The method of claim 19, wherein at least one of the one or more additional endpoint devices is integrated in a root complex.

21. The method of claim 20, further comprising:
sending a read request from a central processing unit to the first endpoint device, the first endpoint device integrated in the root complex; and
sending the read completion from the first endpoint device to main memory, wherein the ordering attribute can always be set to allow the read completion to bypass the one or more pending writes from the at least one additional integrated device.

22. The method of claim 20, further comprising:
sending a read request from a central processing unit the first endpoint device, the first endpoint device integrated in the root complex; and
sending the read completion from the first endpoint device to main memory,
wherein the ordering attribute can always be set to allow the read completion to bypass the one or more pending writes from an additional non-integrated device.

23. The method of claim 20, further comprising:
sending a read request from a central processing unit the first endpoint device, the first endpoint device not integrated in the root complex; and
sending the read completion from the first endpoint device to main memory, wherein the ordering attribute can always be set to allow the read completion to bypass the one or more pending writes from the at least one additional integrated device.

24. The method of claim 20, further comprising:
sending a read request from a central processing unit the first endpoint device, the first endpoint device not integrated in the root complex; and
sending the read completion from the first endpoint device to main memory,
wherein the ordering attribute can always be set to allow the read completion to bypass the one or more pending writes from an additional non-integrated device.

25. The method of claim 12, wherein the transaction ordering mechanism is configured to set a Relaxed Ordering bit in a completion header by a Central Processing Unit (CPU) in the transaction ordering mechanism for a CPU read to an endpoint device.

26. The method of claim 13, wherein said determining operation further includes determining whether the first endpoint device is integrated with the switch fabric-connecting device or not.

27. An apparatus comprising:
means for determining, by a completer, if an ordering attribute of a read completion can be relaxed by the completer independent of whether or not the ordering attribute was relaxed by a requester of a read operation associated with the read completion to allow the read completion to bypass one or more pending writes from one or more devices, wherein the means for determining determines to relax the ordering attribute based on a determination whether at least one of the one or more devices is integrated with a switch fabric-connecting device or not; and means for setting the ordering attribute of the read completion with the completer to allow bypass of the one or more pending writes.

28. The apparatus of claim 27, wherein the means for setting the ordering attribute comprises a means for setting a relaxed order bit in a completion header.

29. The apparatus of claim 27, wherein the apparatus is a peripheral component interconnect.

30. The apparatus of claim 27, wherein a Central Processing Unit (CPU) of the completer is configured to set a Relaxed Ordering bit in a completion header for a CPU read to an endpoint device.

31. The apparatus of claim 27, wherein the read operation is associated with a first device, and wherein the means for determining determines to relax the ordering attribute further based on a determination whether the first device is integrated with the switch fabric-connecting device or not.

* * * * *